United States Patent [19]

[11] 3,718,746

Kitamura et al.

[45] Feb. 27, 1973

[54] AUTOMATIC SOUND-REPRODUCING APPARATUS

[75] Inventors: Yoshio Kitamura; Ikuo Suzuki, both of Suwa-gun, Nagano, Japan

[73] Assignee: Kabushiki Kaisha Sankyo Seiki Seisakusho, Suna-gun, Naganom, Japan

[22] Filed: Aug. 28, 1970

[21] Appl. No.: 67,849

[52] U.S. Cl. .......... 84/101

[51] Int. Cl. .......... G10f 1/06

[58] Field of Search .......... 84/94, 95, 98, 101

[56] References Cited

UNITED STATES PATENTS 624,655 5/1899 Jacot .......... 84/98

3,470,784 10/1969 Shiina .......... 84/101

*Primary Examiner*—Richard B. Wilkinson

*Assistant Examiner*—Lawrence R. Franklin

*Attorney*—Waters, Roditi, Schwartz & Nissen

[57] ABSTRACT

An automatic sound-reproducing apparatus designed to cooperate with a relatively rigid music tape or strip on which music is recorded through perforations formed along staff lines that actuate the reproducer means. The automatic sound-reproducing apparatus includes a pair of motor-driven pinch rollers for moving the music tape or strip along its length or in the direction of the staff lines; reproducer means comprising a horizontal shaft driven simultaneously with the pinch rollers and a plurality of discs each having thereon circumferentially spaced, radially extended pins or fingers, said pinned discs being mounted on the horizontal shaft for relative rotation juxtaposed each with two adjacent discs spaced apart from each other at a pre-determined distance substantially equal to the distance between two adjacent lines of the staff; and a metal comb having metal reeds, the free ends of which are extended for contact by the pins or fingers on the discs. When any pin or finger of the pinned disc is brought into engagement with or aligned with the musical-note perforation in the punched music tape or strip which is moved in sliding contact with the discs of the reproducer means responsive to the motor driven pinch rollers, the disc is independently or selectively rotated so that any particular pin or finger thereof touches or plays the metal so as reed to reproduce the sound.

11 Claims, 17 Drawing Figures

AUTOMATIC SOUND-REPRODUCING APPARATUS

The present invention relates to an automatic sound-reproducing apparatus or automatic music box, and more particularly, relates to an automatic sound-reproducing apparatus designed so as to cooperate with a basically-rigid music tape or strip having longitudinally extending staff lines on which music is recorded through perforations (these perforations will be hereinafter referred to as "musical-note perforations") that actuate the reproducer device.

Various kinds of automatic music box have been proposed, which capable of mechanically reproducing music with the use of the punched tape or strip on which music is recorded through perforations. However, so far as is known, none has been put into practice because of excessively high costs in manufacture, complexity constructing in the reproducer means for touching the metal, reeds and general inferiority in the obtained tone quality. A conventional music box of such type, moreover, requires extreme accuracy in preparing the perforated music tape or strip.

It is accordingly a primary object of the present invention to provide an automatic sound-reproducing apparatus adapted to cooperate with the perforated tape or strip, including a reproducer device that is simple in mechanical structure, rich in operational, and improved in tone quality.

It is another object of the present invention to provide an automatic sound-reproducing apparatus of the character herein described, which requires little skill in preparing the perforated music tape or strip so that anyone may readily enjoy one's own music or melody.

With the above objects in view, the present invention resides, basically, in an improved automatic sound-reproducing apparatus including a pair of motor-driven pinch rollers for moving the music tape or strip along its length or in the direction of longitudinal staff lines thereon including a reproducer device having a horizontal shaft driven simultaneously with the pinch rollers and a plurality of discs each having thereon circumferentially-spaced, radially-extended pins or fingers, the discs being mounted on the horizontal shaft for relative rotation in juxtaposition, with each two adjacent discs being spaced apart from each other at a pre-determined distance subsequently equal to the distance between adjacent staff lines; and a metal comb having juxtaposed metal reeds extended so as to be touched by the pins or fingers on the discs. Accordingly, when any pin or finger is brought into engagement with or received by the musical-note perforation in the punched music tape or strip conveyed in sliding contact with the discs of the reproducer device in response to the force of the motor-driven pinch rollers, the disc is independently or selectively rotated so as to cause its residual pin or finger to touch the metal reed, which is thereby vibrated to produce the sound.

Another feature of the present invention resides in an improved automatic sound-reproducing apparatus of the character described which is provided with a device for aligning the discs, upon completion of the tape reproduction, into a fixed in-operative angular position to prevent the pin or finger of the juxtaposed discs from extending into the path for the music tape or strip. In other words, all pins or fingers of the juxtaposed discs are maintained above the tape guide surface at a clearance sufficient to allow the leading end of the music tape to freely travel below the reproducing means.

A further feature of the present invention resides in an improved automatic sound-reproducing apparatus of the character described which has the reproducer device comprising a shaft driven from a suitable power source, with the discs rotatably mounted side by side on the shaft, and including spacer elements secured on the shaft against rotation relative thereto, the spacer elements being each placed between each two adjacent discs so as to provide frictional engagement with the adjacent discs.

A further feature of the present invention resides in an improved automatic sound-reproducing device of the character described providing for mountings for the pinch rollers which are simple in assemblage, and structure and further capable of automatically adjusting the compression between the pinch rollers according to the thickness of the perforated music tape or strip passing therebetween.

In accordance with a further feature of the present invention, there is proposed an improved automatic sound-reproducing apparatus of the character described wherein there is provided a normally opened switch mechanism adapted to, upon being closed, energize the electric motor in a forward rotational direction where the reproducer device and pinch rollers are both rotated in the same direction as the direction of tape travel with the normally opened switch means including a fixed contact and a cooperative movable contact which is placed just below the reproducer device in the tape path so as to be turned on by engagement with the side edge of the perforated music tape conveyed along the tape path.

Another feature of the present invention resides in an improved automatic sound-reproducing apparatus of the character described wherein there is provided a normally opened first switch mechanism, which upon closing, energizes the electric motor for rotation in the reverse direction with respect to that in which the reproducer device and the pinch rollers are both rotated, in effect, in the opposite direction to that of the tape travel, said first switch mechanism including a fixed contact and its cooperative movable contact which is arranged in the tape path upstream of the reproducer device as regards the tape travel direction so as to be turned on by the leading end of the music tape prior to engagement of the reproducer means with the music tape. There is also provided a normally opened second switch mechanism, which upon closing, turns off the reverse circuit for the electric motor and alternately to actuate the electric motor in the forward direction while the reproducer device and pinch rollers are both driven in the same direction as the tape travel direction, the second switch mechanism including a fixed contact and a cooperative movable contact which is arranged in the tape path downstream of the reproducer device as regards the tape travel direction so as to be turned on by the music tape after the leading end of the music tape has been advanced through the reproducer means station.

In accordance with a further feature of the present invention, there is provided an improved reproducer device for the automatic sound-reproducing apparatus of the character described, which is capable of successfully playing two musical-note perforations which are punched out on the same staff line in sequence with a shorter distance between them.

The foregoing and other objects and features of the present invention will become apparent upon consideration of the following description when taken in conjunction with the accompanying drawings in which:

FIGS. 5A and 5B are, respectively, schematic views explanatory of operation of the disc alignment device shown in FIG. 3, wherein FIG. 5A illustrates the condition where the discs are all maintained at their inoperative angular position and FIG. 5B illustrates the second condition where the discs are all released from the alignment means for free rotation;

Figure 10:
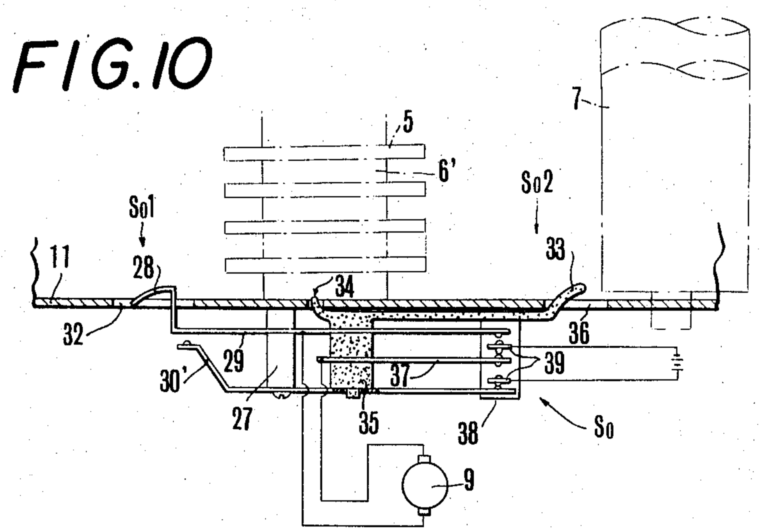
FIG. 10 is a fragmentary sectioned view illustrating a modified switching device which differs from the switching device shown in FIG. 4 in that this modification involves an additional contact for reversing the reproducer device.
Figure 11A:
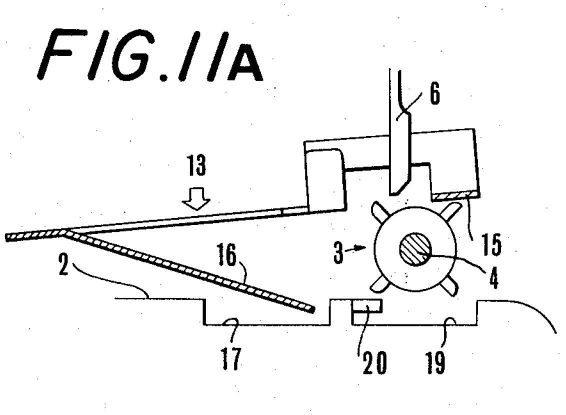
Figure 11B:
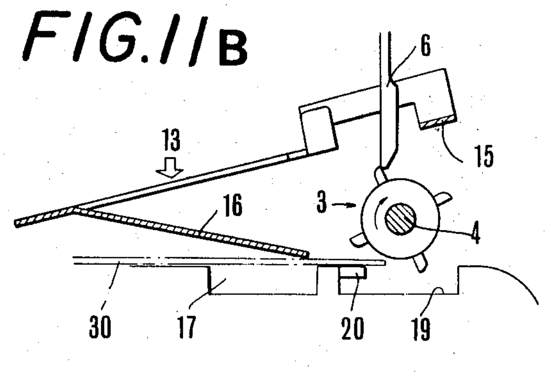
Figure 12:
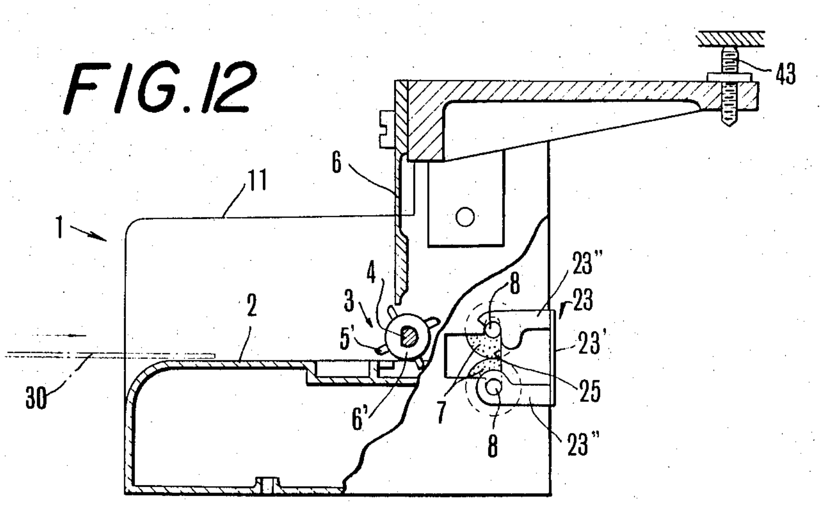
Figure 13:
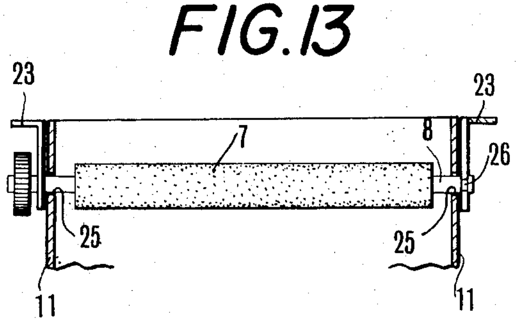
Figure 14:
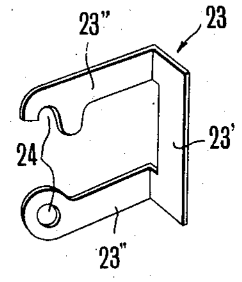
Figure 15:
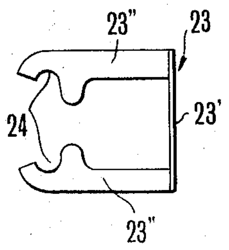

FIGS. 11A and 11B are, respectively, schematic views illustrating the reverse rotation of the reproducer device caused by operation of the switching device shown in FIG. 10, wherein FIG. 11A shows the inoperative condition just before starting the motor, and FIG. 11B shows the second condition where the discs are reversely rotated by reverse driving of the motor through such an angular distance that any one pin on each disc is abutted against its associated metal reed on the metal comb;

FIG. 12 is a front view showing a preferred embodiment of a mounting arrangement especially designed for supporting the pinch rollers in the present invention;

FIG. 13 is a fragmentary horizontal sectioned view showing the arrangement in FIG. 12; and FIGS. 14 and 15, respectively, are perspective view and front view of the arrangement of FIG. 12.

In the following description and claims, various details will be identified by specific names for convenience. These names, however, are intended to be as generic in their application as the art will permit.

Figures 1, 4:
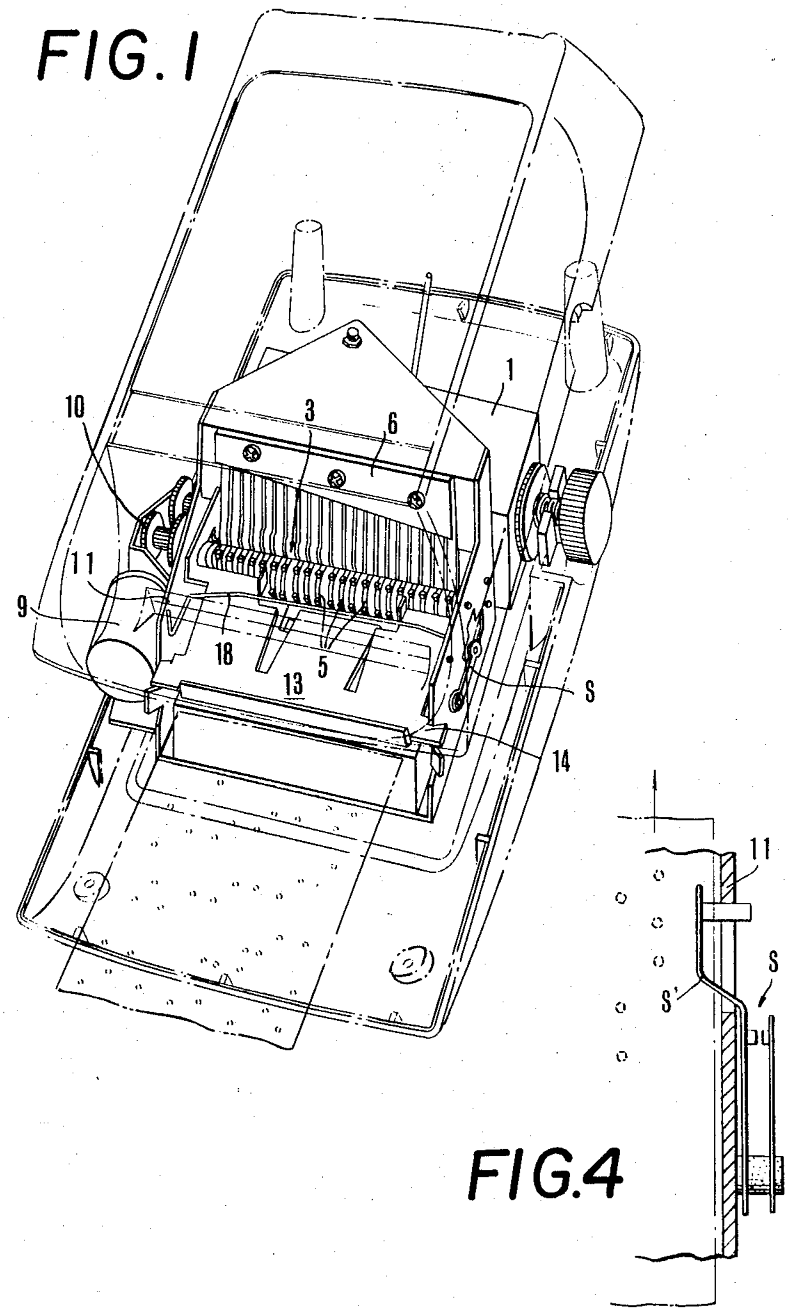
FIG. 1 is a perspective view illustrating an automatic sound-reproducing apparatus embodying the present invention, with a perforated music tape being shown by phantom lines.
FIG. 4 is a fragmentary sectioned view showing a switching mechanism adapted to be turned on by the leading end of the perforated music tape or strip.
Figure 2:
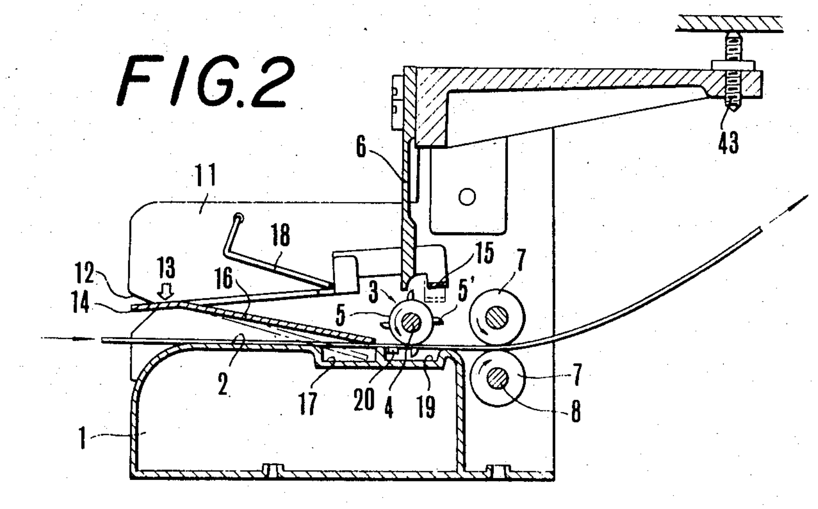
FIG. 2 is a vertically sectioned view illustrating the apparatus according to the present invention shown in FIG. 1.

Referring now to FIGS. 1 and 2, there is generally shown a preferred embodiment of an automatic sound-reproducing apparatus according to the present invention. In the drawings, reference numeral 1 represents a main frame, 2 a tape guide surface arranged horizontally on the main frame 1, and 3 a reproducer device or means arranged above and ahead of the tape guide surface 2. The reproducer means 3 is herein shown placed at the right-handed portion of the main frame 1 as viewed in FIG. 2. The reproducer means 3 basically comprises a horizontal rotating shaft 4, and a plurality of discs 5 mounted on the shaft 4 for free rotation thereon in juxtaposition. The disc 5 has a suitable number, preferably four as shown in the drawings, of circumferentially spaced, radially-extended pins or fingers 5'. Further provided between each of two adjacent discs 5 is a spacer element 6' which is mounted on the rotating shaft 4 against rotation relative thereto, whereby each two adjacent discs 5 may be maintained in an axially spaced relation from each other by a distance substantially similar to the interval between two parallel staff lines.

The juxtaposed discs 5 are all urged unidirectionally axially of the rotating shaft 4 through use of a resilient element, as will be hereinafter described in full detail, whereby the discs 5 are each brought into frictional engagement with its adjacent spacer element 6' in such a manner that they may, in the absence of any load, rotate in unison with the rotating shaft 4. However, when any disc 5 is subjected to a load beyond a predetermined level, it will overcome the frictional force exerted thereon by the adjacent spacer elements 6', thereby causing relative rotation with respect to the spacer elements 6 not withstanding of the frictional engagement therebetween.

The rotating shaft 4 may be driven from a suitable power source, for example, an electric motor 9 fixed on the main frame 1, through power-transmission means, such as for example, a suitable gear train 10 which is operatively connected to one extremity of the shaft 4. It will thus be understood that, when the shaft 4 is driven from the electric motor 9, the discs 5 are, as long as no load is exerted upon the pins or fingers thereof, driven or rotated in unison with the shaft 4 under influence of their frictional engagement with the spacer elements 6 which are fixed on the shaft 4.

Preferably, the rotating shaft 4 has mounted thereon a tape-transporting sprocket (not shown) which is adapted to be meshed with a series of apertures in the music tape (refer to the phantom line in FIG. 9) to ensure the positive feed of the tape.

Horizontal pinch rollers 7 and 7 which are arranged one above the other, are positioned downstream of the reproducer means 3 with reference to the direction of the tape travel. One shaft 8 of the pinch rollers 7 and 7 is arranged to be driven from the motor 9 through the power-transmission means 10 as in the case of the shaft 4 of the reproducer means 3.

Provided above the reproducer means 3 is a metal comb 6 having a plurality of juxtaposed metal reeds extending in a vertically depending manner. The metal comb 6 is arranged in such a position that the lowest ends or the free ends of the metal reeds are extended within or contacted by the pins of discs 5 of the reproducer means 3. It will be thus understood that rotation of the disc 5 moves any one pin 5′ on the disc 5 into contact with its corresponding metal reed and additional rotation of the same disc 5 in opposition to the resiliency of the metal reed causes the pin 5′ to play the metal reed. It will be further appreciated that cooperation of the discs 5 with the metal reeds as described above is quite similar in principle to the music producing means in the conventional music box and the like.

Upwardly extending above the tape guide surface 2 of the main frame 1 are opposed guide walls 11 and 11 with a lateral spacing distance which is substantially equal to the width of the perforated music tape. Provided on either one of the opposed guide walls 11 and 11 is a normally opened switching mechanism S adapted to turn on or off the electric circuit for the motor 9. The normally opened switching mechanism S has a movable contact element S′ which is located just below the reproducer means 3 so as to slightly bend into the tape path or on tape guide surface 2. The construction of this switching mechanism S will be hereinafter described in greater detail.

Figures 3, 6:
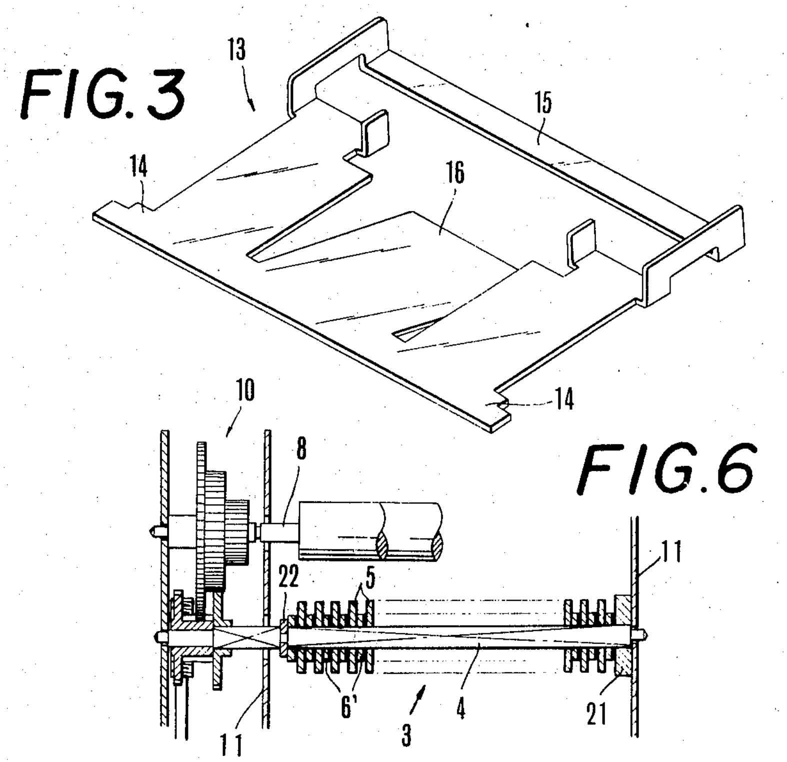
FIG. 3 is a perspective view illustrating means for aligning discs of a reproducer device into a fixed angular in-operative position.
FIG. 6 is a fragmentary sectioned view illustrating mechanical assemblage of the discs with a common shaft for the reproducer device.

The opposed guide walls 11 and 11 are further provided with rearwardly-opening Vee notches 12 which have therein laterally-extending ear portions 14 and 14 pivotally supported on a pinned disc alignment means 13, the structure of which is clearly illustrated in FIG. 3.

The disc alignment means 13, as apparent from FIGS. 2 and 3, comprises a pair of externally extending ear portions or journal portions 14 and 14, a pair of opposed arm members each fastened to be integral with the ear portion 14 and extended forwardly from the latter, a flat bar 15 spanned across the foremost free ends of the arm members 14 and 14, and a plate member 16 integral with the arm members and extended forwardly and downwardly at a suitable angle relative to the arm members. The disc alignment means 13 is arranged so that the flat bar 15 overhangs the reproducer means in a cantilever manner while the plate member 16 extends into a recessed portion 17 in the tape guide surface 2. The disc alignment means 13 is normally urged downwardly by the action of a substantially U-shaped spring member 18 which is spanned across the pair of guide walls 11 and 11. It will be thus understood that the flat bar 15 normally rests upon pins 5′ on the disc 5 whereby the discs 5 are all locked or maintained against unexpected rotation at a common angular position.

In FIG. 2, furthermore, reference numeral 19 represents a transversely extending recess provided in the tape guide surface 2 for ensuring the positive engagement of the pins 5′ with the musical-note perforations in the music tape as well as the free rotation of the discs 5 without hindrance, and reference numeral 20 represents any one of the lips which extend over the recess 19 in a cantilever manner in coplanar alignment with the tape guide surface 2 of the main frame 1 and which are also arranged side by side in a comb-like array with each adjacent two being spaced apart from each other to permit the free rotation of the disc 5.

Referring now to FIG. 4, there is shown in full detail the normally opened switching means S comprising a fixed contact element mounted on the outside surface of either guide wall 11 or 11, and a movable contact element S′ provided in cooperation with the fixed contact element. The movable contact element S′ of the switching means S has a free end bent into the tape path through an opening in the guide wall 11 so that the leading end of the music tape advanced along the tape path may urge laterally outwardly the movable contact element S′ to thereby turn on the switching means S.

Now described in the following is the operation of the automatic sound-reproducing apparatus constructed according to the preferred first embodiment of the present invention as mentioned above in conjunction with FIGS. 1 to 4.

Figure 5A:
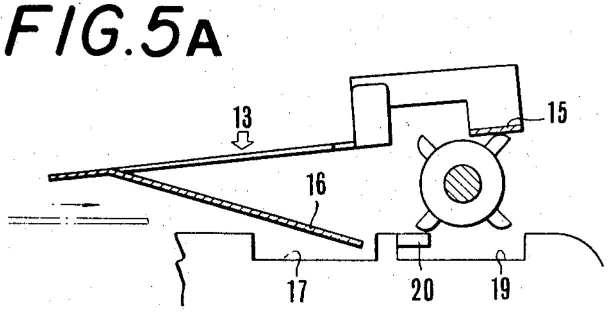

Assuming that the automatic sound-reproducing apparatus is ready for playing the music which has been recorded on the music tape in perforations, the disc alignment means 13 is normally maintained by the depressing action of the wire spring 18 in its lowered position, as shown in FIG. 5A, while the plate member 16 extends into the recessed portion 17 in the tape guide surface 2 while the horizontal flat bar 15 is in interference with rotational movement of the discs 5. In such condition, any one pin 5′ on the disc 5 abuts upwardly against the lower surface of the flat bar 15 whereby the juxtaposed discs 5 are all locked against rotation at a common angular position, as shown in FIG. 5A, where no pin 5′ of the discs 5 obstructs travel of the music tape advanced along the tape guide surface 2. It will thus be understood that there is now ensured a free pass for the music tape over the full width thereof between the pins 5′ of the discs 5 and the tape guide surface 2.

Figure 5B:
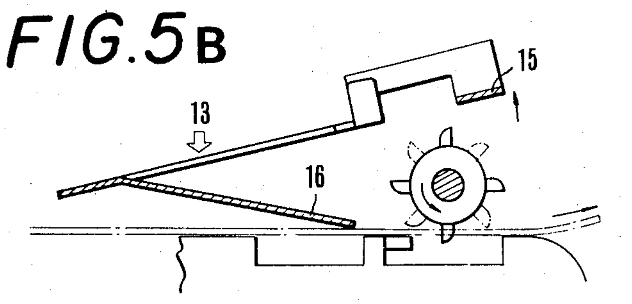

When the substantially rigid music tape or strip 30 having the music-note perforations (refer to FIG. 9) is manually thrust towards the right, as viewed in FIG. 5A, along an arrow mark upon the tape guide surface 2, the leading end of the music tape 30 is firstly abutted against the lower side of the plate member 16 of the disc alignment means 13, which plate member 16 is at that time positioned so as to extend across the tape path as shown in FIG. 5A. Further advancing of the music tape 30 causes upward swinging of the plate member 16, whereby the disc alignment means 13 effects the upwardly rocking movement around the pivotal support 12 against the resilient force of the wire spring 18, with the result that the discs 5, currently locked at the common angular position against rotation, are all released into an operative condition, as shown in FIG. 5B, so that the reproducer means 3 may be freely rotatable in the same direction as the direction of tape travel.

The leading end of the perforated music tape which has passed under the plate member 16 is then advanced along the tape guide surface 2 and passes over the lips which are arranged side by side in a comb-like array. Upon the leading end of the perforated music tape approaching just below the reproducer means 3, the tape end urges at its side edge laterally outwardly the movable contact element S′ to thereby turn on the switching mechanism S which in turn establishes the electric circuit to energize the motor 9 so that the shaft 4 of the reproducer means 3 commences rotating forward together with the pinch rollers 7 and 7.

The switching mechanism S is kept in its closed or ON condition, as long as the music tape passes through under the reproducer means 3 or the tape edge laterally biases the movable contact element S′. It will be thus understood that the music tape should have enough rigidity to overcome the resiliency of the movable contact element S'.

The leading end of the music tape which has left the reproducer means 3 is then nipped between opposed pinch rollers 7 and 7 which rotate so as to positively advance or forwardly feed the music tape.

On the other hand, the discs 5 of the reproducer means 3 may normally rotate in unison with the motor-driven shaft 4 by frictional engagement with the spacer elements 6', provided that there is no load applied to the pins 5' of the discs 5. However, in the case where the pins 5' of the juxtaposed discs 5 are brought into contact with the upper surface of the music tape 30, the discs 5 are prevented from further rotation so that their frictional engagement with the adjacent spacers 6' is overcome and, accordingly, the shaft 4 with the spacers 6' continue rotation relative to the discs 5 the latter of which are locked against rotation by contact with the music tape 30.

Assuming now that the music tape 30 is further advanced or fed by a traction force exerted thereon by the pinch rollers 7 and 7 and any one of the music-note perforation provided in the tape just below its corresponding disc 5, this disc 5 is now released from the load exerted upon its pin 5' and is thus freely driven by the rotating shaft 4 through frictional engagement with its adjacent spacers 6' whereby the pin 5' rotatingly enters the music-note perforation of the advanced music tape.

Thereafter, the disc 5 is forced to rotate concurrent with further travel of the music tape, as a result of which any residual pin 5' on the same disc 5 may touch or play its corresponding metal reed (refer to solid lines in FIGS. 2 and 5B).

Then, upon the desired metal reed being thus played, the pin 5' currently engaged in the music-note perforation in the music tape disengages from the same perforation and the disc 5 effects further rotation, following upon the movement of the shaft 4 until another pin on the same disc comes into contact with the tape surface with the result the disc is restrained from rotation.

It will be thus understood that, whenever the music-note perforation passes under its corresponding disc 5 in such a manner as described just above, any one pin 5' of the same disc 5 falls into the music-note perforation so that the disc 5 rotates so as to touch the metal reed for reproduction of the music which has been previously recorded in the tape 30. As soon as the trailing end of the tape leaves the plate member 16 after the reproducer means 3 has finished playing the music, the plate member 16 is released so as to extend into the recessed portion 17 in the tape guide surface 2 whereby the disc alignment means 13 effects a downwardly rocking movement in the clockwise direction, as viewed in FIGS. 5A and 5B, to its lowered position so that the flat bar 15 may be in engagement with the pins 5' to thereby lock the discs 5 against rotation. Subsequently, the trailing end of the music tape 30 leaves the movable contact element S', as the result of which the switching mechanism S is turned off or opened to de-energize the motor 9. Thus, the discs 5 are all kept in alignment with each other at a common angular position whereby no pin 5' of the discs 5 obstructs travel of the music tape which is now newly inserted along the tape guide surface 2.

It is preferable that the movable contact element S' of the normally-opened switching mechanism S extends along the tape path at least to the nip line of the opposed pinch rollers 7 and 7, since the music tape may thereby be subjected to the continuous traction until the trailing end of the music tape completely extends out of the pinch rollers 7 and 7.

Furthermore, while the preferred embodiment of the present invention as described herein has lips 20 in a comb-like array which all extend from the rear transverse edge of the recessed portion 19 in a cantilever manner, these lips may be designed so as to completely project over the recess 19. In the latter design, the music tape 30 may be flatly supported over the whole recess 19 so that there is no failure of pin-and-perforation engagement, which may otherwise occur where the music tape portion riding over the recess 19 is deflected downwardly due to folds or creases.

Figure 7:
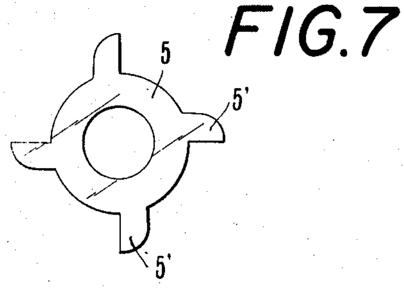
FIG. 7 is an enlarged front view of a disc.
Figure 8:
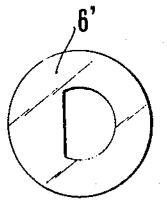
FIG. 8 is an enlarged front view showing a spacer element adapted to be placed side by side between two adjacent discs.

Referring now to FIGS. 6 to 8, there is shown an embodiment of the reproducer means 3 in full detail. This reproducer means 3 essentially comprises a horizontal shaft 4 driven from the motor 9 through the power transmission 10, a plurality of discs 5 mounted side by side on the shaft 4 for free rotation relative thereto, and a plurality of spacer elements 6' mounted on the shaft 4 against rotation relative thereto and arranged whereby each spacer element 6' is located between each two adjacent discs 5, and wherein the discs 5 and spacer elements 6' are all assembled on the shaft 4 and axially held under compression by a collar 21 and a circle-clip 22 which effect frictional engagement between the disc 5 and the spacer element 6'. For mounting the spacer elements 6' on the shaft 4 against rotation, the spacer element 6' illustrated herein is provided therein with a substantially D-shaped opening as shown in FIG. 8, and the shaft 4 is formed in the D-shaped cross-section which may be closely fitted within the above-mentioned opening of the spacer element. Alternatively, the spacer elements 6' may be keyed or otherwise suitably secured on the shaft 4.

Figure 9:
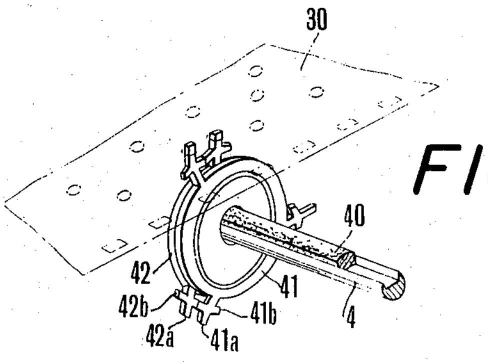
FIG. 9 is a fragmentary perspective view showing a modified reproducer device.

Prior to the present invention, frictional engagement of the discs with the rotating shaft in the reproducer means as described herein has been accomplished by such arrangement as shown in FIG. 9 in which the rotating shaft is provided therein with a longitudinally extended channel wherein an elongated resilient member 40 is securely embedded to provide the frictional portion, while the discs are press-fitted onto the shaft in juxtaposition. This reproducer means, however, has the disadvantage of being time consuming and troublesome in its manufacture or assemblage. A further disadvantage of such prior reproducer means resides in the fact that the frictional area provided between each disc and the common shaft is too small to exert enough frictional force upon the discs.

In contract to this, in accordance with the improved reproducer means of the present invention constructed as described above, the discs 5 are each brought into frictional contact with the adjacent spacer elements 6' and 6' secured on the rotating shaft 4, so that torque of the rotating shaft is effectively transmitted to the discs. An additional advantage of this reproducer means resides in the simplication and improvement in assemblage or manufacture as compared with the prior techniques.

It should be further noted that the frictional force exerted upon each disc 5 from its adjacent spacer elements 6' should be determined so that, upon the pin 5' on the desired disc 5 being rotatingly abutted against its corresponding metal reed, the disc 5 commences rotation relative to the rotating shaft unless an additional force of rotation is applied to the disc 5 to cause its pin to play the metal reed.

Referring further to FIGS. 12 to 15, there is illustrated a novel bearing that is especially designed for the pinch rollers in the automatic sound-reproducing apparatus of the present invention.

The bearing 23 proposed herein, as apparent from FIGS. 14 and 15, comprises a connecting portion 23' made of a blank high in resiliency or flexibility, having upper and lower arm portions 23'' and 23'' welded to or formed integral with the opposite ends of the connecting portion 23' and extending therefrom in parallel with each other, with the arm portions being provided at the free ends thereof with notches or holes 24 for receiving therein the journal portions of the pinch roller shafts 8 and 8, respectively, in a manner as will be described below.

The opposed side walls 11 and 11 of the main frame 1 are respectively provided with vertically elongated slots 25 and 25 through which are extended opposite end portions of the shafts 8 and 8 of the rubber-made pinch rollers 7 and 7 which are vertically arranged one upon the other. The opposite end portions of the pinch roller shafts 8 and 8, thus extended laterally outwardly of the main frame 1, are each provided with annular grooves 26. In assemblage, the arm portions 23'' and 23'' of the bearing means 23 are loosely fitted at their free ends into the annular grooves 26 on the pinch roller shafts 8 and 8, whereby the pinch rollers 7 and 7 are both journalled in the main frame 1 with a predetermined interaxial space therebetween.

Although there is illustrated in FIGS. 12 and 14, by way of example, the bearing means wherein any one of the arm portions, for example the upper arm portion, has at its free end an opened notch while the other arm portion has at its free end a closed through-hole, it is evident that the arm portions of the bearing means may be respectively provided at the free ends thereof with the notches which are opened in opposition to each other, as shown in FIG. 15.

The function of the bearing means as described above is as follows:

When the leading end of the music tape, thrust forwardly along the tape path as shown in FIG. 12, is nipped between the pinch rollers 7 and 7 which is under a driven condition, these rollers 7 and 7 are equally urged in opposite directions by a pressure depending upon the thickness of the tape, and have a tendency of being spaced apart from each other.

Such pressure exerted upon the pinch rollers by the music tape, however, is taken in deflection through the arm portions 23'' and 23'' into the connecting portion 23' of the bearing means 23. As a result, the bearing means 23 is resiliently deflected at its connecting portion 23' to thereby permit the pinch rollers to move away from each other for the distance which is substantially equal to the tape thickness. In this condition, the music tape is nipped more snugly between the pinch rollers 7 and 7 under the suitable compression due to the resilient-restoring force in the deflected connecting portion 23' of the bearing means 23.

With the trailing end of the music tape completely leaving the nipping line on the pinch rollers 7 and 7, the connecting portion 23' of the bearing means 23 is released from its deflected condition to thereby restore its initial or normal condition where the pinch rollers 7 and 7 are maintained with the fixed interaxis.

As becomes apparent from the foregoing, in accordance with the bearing means as described herein, since the pinch rollers may be resiliently moved away from each other by the distance which is substantially equal to the tape thickness, they are subjected to no excessive compression which may otherwise result in the roller wear adversely affecting the useful life.

Further advantageously, the constant engaging-pressure acting on the pinch rollers may be always provided throughout the tape travel by the action of the restoring force accumulated in the deflected connecting portion 23' of the bearing means 23.

From the foregoing, it will be understood that the connecting portion 23' is preferably made of a resilient flat strip member which is oriented such that its width is in the plane parallel with the axial direction of the roller shaft to provide more effective flexibility.

It will be moreover understood that the slot 25 in the side wall 11 should have the vertical length longer than the interaxial space of the roller shafts or enough to allow the roller shafts to move away from each other by a certain distance.

Referring to FIG. 10, there is illustrated a modified switching mechanism S*o* which may be used instead of the switching mechanism S shown in FIG. 4. This modified switching mechanism S*o* includes a normally opened reversing switch S*o*1 which may, upon closing, establishes a circuit for energizing reversely the motor, and another normally-opened forward switch S*o*2 which may, when being closed, makes a circuit for energizing forwardly rotation of the motor. The reversing switch S*o*1 comprises a movable contact element 29 and a stationary contact element 30' positioned in opposition to said movable contact element, both contact elements being supported on an insulating bracket 27 secured on the exterior face of the side wall 11. The movable contact element 29 is further provided at its one end with a feeler portion 28 which is bent into the tape path through a slot 32 in the side wall 11, upstream of the reproducer means 3 with respect to the direction of tape travel.

The movable and stationary contact elements 29 and 30', constituting the reversing switch S*o*1 as described above, are also mechanically connected to a second insulating bracket 35 which is pivotally supported at 34 on the side wall 11 of the main frame 1. The second insulating bracket 35 has a feeler portion 33 which normally projects into the tape path through a slot 36, downstream of the reproducer means 3 with respect to the direction of tape travel. The second insulating bracket 35 has mounded thereon a further contact element 37.

The three contact elements 29, 30' and 37 equally extend from the second insulating bracket 35 to the right, as viewed in FIG. 10, or upstream of the bracket 35 with respect to the direction of tape travel and the free end of these extended contact elements are terminated in opposition to fixed contacts 39, which are connected across the suitable power source and mounded on a third insulating bracket 38, to thereby provide the forward switch S*o*2. Further, as is apparent from FIG. 10, the fixed contacts 39 are arranged such that the free ends of the extended contact element 30' and 37 are normally in contact with the positive-side fixed contact and the negative-side fixed contact, respectively, while the free end of the extended movable contact element 29 is normally spaced at a distance from the negative-side fixed contact. Contact arrangement in the forward switch S*o*2 is further designed so that, when the feeder portion 33 is pushed aside to rock or swing laterally or outwardly the movable insulating bracket 35 about its pivotal point 34, the contact elements 29, 37 and 30' mounted on such insulating bracket 35 in juxtaposition are deflected outwardly while maintaining a parallel relationship with each other so that the contact element 29 is thrown into engagement with the negative-side fixed contact and, at the same time, the contact element 37 is turned from the negative-side fixed contact to the positive-side fixed contact while the contact element 30' is out of engagement with the positive-side fixed contact. It will be further understood that the contacts 37 and 30' are connected across the reversible motor 9.

Operation of the modified switching mechanism S*o* will be now described in conjunction with FIGS. 10, 11A and 11B. With the music tape being introduced along the tape guide surface 2 of the main frame 1, the disc alignment means 13 is moved upwardly from its lowered position shown in FIG. 11A to its lifted position shown in FIG. 11B, whereby the discs 5 are all released for free rotation thereof. When the music tape is further advanced, it urges the movable contact element 29 laterally outwardly of the tape path, thereby turning the reversing switch S*o*1 on to energize the motor 9 in the reverse direction.

Upon reverse driving of the motor, the reproducer means 3 is also rotated in the reverse direction or the clockwise direction, as viewed in FIG. 11A, whereby the first pins on the discs are concurrently brought into abutment with their corresponding metal reeds. In such condition, as apparent from FIG. 11B, the second pins on the discs are spaced above the tape path to allow the music tape to pass under such second pins, while the third pins, each opposed radially to the first pin abutting the metal reed, are in such an attitude as to intersect the tape path. The music tape, upon further advancement, forces forwardly the third pins on the discs, whereby these discs are forcibly rotated relative to the driving shaft 4 against the torque exerted thereupon from the motor, until they go back to the angular position as shown in FIG. 11A to permit the music tape to flow under the reproducer means 3 without hindrance.

Thereafter, the music tape reaches approximately halfway between the reproducer means and the pinch rollers. The leading end of the music tape, thus advanced, may then push aside the feeler portion 33 which in turn causes the movable insulating bracket 35 to rock or swing laterally outwardly about the pivotal point 34. Thus, the stationary contact element 30' alone is moved away from its corresponding fixed contact 39 in a manner as described above, as the result of which the circuit for energizing the motor for reverse rotation is cut off regardless of closure of the reversing switch S*o*1, whereas the circuit for energizing the motor for forward rotation is established to drive forwardly the pinch rollers which in turn move the music tape.

Upon the trailing end of the music tape having left the feeler portion 28 of the reversing switch S*o*1, the movable contact element 29 is resiliently restored to its normal position to thereby open the reversing switch S*o*1. Nevertheless, the forward switch S*o*2 is still kept in its closed condition whereby the music tape is continued to be forwardly driven by means of the pinch rollers 7 and 7.

As soon as the trailing edge of the music tape leaves the feeler portion 33, the movable insulating bracket 35 is immediately returned to its normal or initial position while both the reversing and forward circuit for the motor are turned off to thereby de-energize the motor. On the other hand the music tape may completely leave the pinch rollers which still continue in an inertia rotation.

In the apparatus as heretofore described in conjunction with FIGS. 1 to 4 wherein there are provided the disc alignment means and the forward switching mechanism which is arranged between the reproducer means station and the pinch rollers, when the music tape currently inserted to the switching mechanism has been pulled back for some reason or the other, it is further required to realign the juxtaposed discs into their common angular condition where the new music tape may be freely inserted without hindrance. This is relatively disadvantageous in the interest of simple and easy operation of the apparatus.

In accordance with the modified switching mechanism S*o* shown in FIG. 10, in contrast with the foregoing, even if the music tape is pulled back after the motor has once commenced rotating forwardly, the motor is necessarily reversed by insertion of the new tape whereby the pinned discs are rotated in the clockwise direction, as viewed in FIGS. 11A and 11B, so as to be set in the angular position shown in FIG. 11B where the tape path is freely opened. Thus, the modified switching mechanism described heretofore provides an advantageous feature wherein the tape replacement may be carried out without trouble.

Referring finally to FIG. 9, there is shown schematically a modification of the reproducer means available for the automatic sound-reproducing apparatus of the present invention.

This modification is characterized in that the discs 41 and 42 arranged on the rotating shaft 4 are in pairs, the number of each pair corresponding to that of the metal reeds of the metal comb. The discs 41 and 42 belonging to each pair are, respectively, provided on the peripheries thereof with a plurality, for example three pieces, of circumferentially spaced, radially extended pins **41*a* and 42*a*** which are laterally offset toward each other to play or touch the same metal reed.

The radial pins **41*a* and 42*a* also have circumferentially extended noses 41*b* and 42*b*, respectively, so that relative rotation between the discs 41 and 42 in pair is restricted when two adjacent noses 41*a* and 42*a* are brought into abutment against each other. It will be thus understood that the radial pins 41*a* and 42*a* are normally spaced away from each other at a circumferential interval which is defined by the combined length of the noses 41***b* and 42*b*.

Although the frictional engagement of the discs with the rotating shaft is illustrated, in FIG. 9, provided by the same manner as the prior art wherein the frictional bar 40 is fitted in the rotating shaft 4, it will be understood that the arrangement shown herein in conjunction with FIGS. 6 to 8 may be also employed wherein the spacer elements rigidly secured against rotation on the rotating shaft are each provided between each two adjacent discs for frictional engagement with the shaft.

Conventionally, it has been experienced with frequency that the two musical-note perforations are provided on the same staff line in sequence with a short interval therebetween. In such case, it has been found that the disc may engage with any one of its pins with the first musical-note perforation to play the metal reed, but never fails to engage with the second perforation because the second perforation extends past the reproducer means station before the succeeding pin on the disc comes into abutment against the travelling music tape. In order to cope with this problem, it is preferable to increase the member of the pins on the same disc. Such an increase, however, introduces a new problem wherein, immediately after any one pin has played its corresponding metal reed, the succeeding adjacent pin of the same disc reaches within amplitude of the vibrated metal reed to disturb the sound reproduction.

The modification of the reproducer means, illustrated in FIG. 9, has been found an effective solution of the above-mentioned problem. In accordance with this modification, the music-note perforations arranged on the same staff line in sequence with a short distance may be positively caught by pins 41*a* and 42*a* and, further, there is no fear that any pin disturbs the sound reproduction of its corresponding metal reed because the adjacent pins 41*a* and 42*a*, respectively, belong to separate discs 41 and 42 which may make relative rotation.

It is, of course evident, that the entire apparatus constructed as described above is contained or encased within a housing or sound box illustrated in FIGS. 1 and 2 through phantom line. Preferably the sound box is bolted or otherwise mechanically connected to the apparatus, especially to the metal comb at 43 to effectively increase the power or beauty of tone produced by the vibrated metal reed.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. In an automatic sound-reproducing apparatus, the improvement comprising in combination:

a music tape having staff lines displayed horizontally thereon, music recording perforations on said staff lines, a main frame having a flat guide surface providing a tape path along which said perforated music tape may be advanced longitudinally in the direction of its staff lines, a power source mounted on said main frame, reproducer means comprising a rotating shaft arranged above and transversely of said main frame and driven by said power source, a plurality of discs having thereon circumferentially spaced radially extended pins, said discs being mounted on said rotating shaft, such that said pins make contact with said tape and extend through said perforations, a metal comb having a plurality of metal reeds, said comb mounted such that said reeds are played by corresponding pins through said perforations as said tape rotates said discs, and a pair of pinch rollers driven from said power source for moving said tape.

2. An apparatus as claimed in claim 1, said discs being mounted on said rotating shaft in paired relationships, and the radially extended pins on each said paired discs being laterally bent towards each other so as to engage perforations on said tape in the same staff line.

3. An apparatus as claimed in claim 1, said power source comprising an electric motor; and normally-open switching means for energizing said motor, said switching means comprising a stationary contact and a cooperative movable contact, said movable contact extending into the path of said tape downstream of said reproducer means and being urged toward contact with said stationary contact in response to engagement by the leading edge of said tape, and contact between said stationary and movable contacts closing said switching means so as to correspondingly energize said motor for driving said pinch rollers.

4. An apparatus as claimed in claim 3, said movable contact extending forwardly along the tape path to at least the nip line between said pinch rollers.

5. An apparatus as claimed in claim 1, said power source comprising an electric motor;

a first normally-open switching means for energizing said motor, said switching means comprising a stationary contact and a cooperative movable contact, said movable contact extending into the path of said tape upstream of said reproducer means and being urged toward contact with said stationary contact in response to engagement by the leading edge of said tape so as to close an electrical circuit energizing said motor for reversely driving said reproducer means and said pinch rollers relative to the direction of tape travel; and a second normally-open switching means for energizing said motor, said switching means comprising a stationary contact and a cooperative movable contact, said movable contact extending into the path of said tape downstream of said reproducer means and being urged toward contact with said stationary contact in response to engagement by the leading edge of said tape so as to open said electrical circuit, said switching means concurrently closing a second electrical circuit energizing said motor for driving said reproducer means and said pinch rollers in a forward direction of travel.

6. An apparatus as claimed in claim 5, wherein the movable contact of said second switching means extends forwardly along the tape path to at least the nip line between said pinch rollers.

7. An apparatus as claimed in claim 1, including means for aligning said discs, upon completion of tape reproduction, into an inoperative position maintaining said pins above the tape path, said aligning means comprising a pair of oppositely extending arm members, each said arm member being pivotably journalled at one end on said main frame; a transversely positioned bar extending between and connected to the free ends of said arm members; a plate fastened to said arm members and extending forwardly and downwardly from said arm members, said transverse bar being cantilevered above said reproducer means and contacting said pins for locking the latter against rotation in a predetermined angular position, and said plate being adapted to abut against a tape guiding surface on said main frame.

8. An apparatus as claimed in claim 1, said main frame including side walls having vertically extending slots, the opposite ends of said pinch rollers being rotatably and slidably journalled in said slots and having portions extending exteriorly of said main frame; a resilient plate member rotatably interconnecting adjacent of said roller portions on at least one side of said frame, said resilient plate member permitting displacement between said rollers for a distance substantially equal to the thickness of the tape extending between said pinch rollers.

9. An apparatus as claimed in claim 1, wherein said plurality of discs are rotatably and slidably mounted on said shaft; spacer means mounted on said rotating shaft, at least one said spacer means being between two adjacent ones of said discs, said spacer means being restrained from rotation and being slidable relative to said shaft; and resilient means axially biasing said spacer means and said discs into frictional engagement for concurrent rotation thereof with said shaft in the absence of loads acting on said discs in opposition to their rotational movement.

10. An apparatus as claimed in claim 1, wherein said main frame comprises a tape-guiding surface positioned below said reproducer means; transversely extending slots in said tape-guiding surface arranged in comb-like array, said slots facilitating rotation of said discs so as to ensure engagement between said pins and said perforated tape.

11. An apparatus as claimed in claim 1, wherein said pins abut against said metal reeds.

* * * * *

UNITED STATES PATENT OFFICE

CERTIFICATE OF CORRECTION

Patent No. 3,718,746 Dated February 27, 1973

Inventor(s) Yoshio Kitamura et al.

It is certified that error appears in the above-identified patent and that said Letters Patent are hereby corrected as shown below:

On the cover sheet insert

-- [30] Foreign Application Priority Data

Japan------September 4, 1969--------------70387/69
Japan------February 17, 1970--------------15959/70
Japan------April 14, 1970-----------------36432/70
Japan------June 23, 1970------------------62946/70
Japan------July 9, 1970-------------------68997/70
Japan------July 13, 1970------------------70168/70

Signed and sealed this 29th day of January 1974.

(SEAL)
Attest:

EDWARD M.FLETCHER,JR.
Attesting Officer

RENE D. TEGTMEYER
Acting Commissioner of Patents